G. L. HARRISON.
CULINARY VESSEL.
APPLICATION FILED JULY 19, 1916.
1,298,940.
Patented Apr. 1, 1919
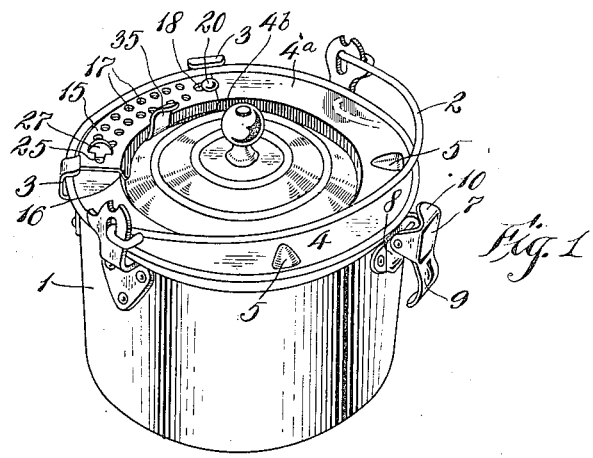
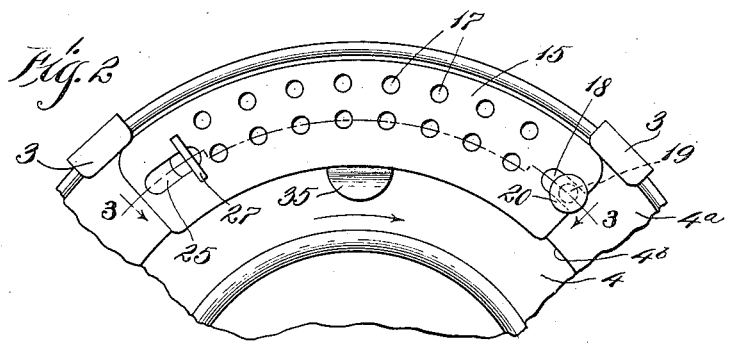
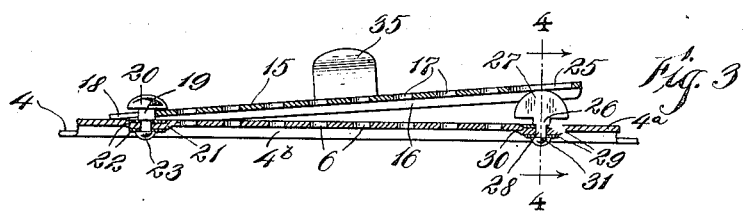
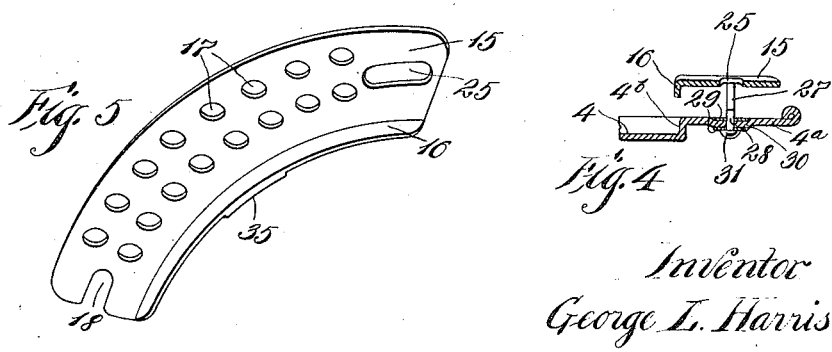
Inventor
George L. Harrison.
By Hull, Smith, Brock & West
Attys.

UNITED STATES PATENT OFFICE.

GEORGE L. HARRISON, OF EAST CLEVELAND, OHIO, ASSIGNOR TO THE CLEVELAND METAL PRODUCTS COMPANY, OF CLEVELAND, OHIO, A CORPORATION OF OHIO.

CULINARY VESSEL.

1,298,940.     Specification of Letters Patent.     Patented Apr. 1, 1919.

Application filed July 19, 1916. Serial No. 110,256.

*To all whom it may concern:*

Be it known that I, GEORGE L. HARRISON, a citizen of the United States, residing at East Cleveland, in the county of Cuyahoga and State of Ohio, have invented a certain new and useful Improvement in Culinary Vessels, of which the following is a full, clear, and exact description, reference being had to the accompanying drawings.

This invention relates to improvements in culinary vessels, and has to do particularly with an improved cover for vessels of this sort.

The invention has for its general object the provision of a vessel having a cover that is provided with drain openings, and with means whereby the openings may be closed when desired, and which means is capable of convenient removal for the purpose of permitting the parts to be thoroughly cleaned. A further object is the provision of a simple construction through which the general purpose of the invention is attained in an efficient and economical manner; and the invention may be defined in general terms as consisting of the combinations of elements set forth in the annexed claims and illustrated in the accompanying drawing forming a part hereof, wherein Figure 1 is a perspective view of a culinary vessel embodying my invention; Fig. 2 is a fragmentary plan view of the vessel shown in Fig. 1, and includes the closure for the openings in the cover; Fig. 3 is a section substantially on the line 3—3 of Fig. 2, and illustrates the manner of removing the closure; Fig. 4 is a sectional detail on line 4—4 of Fig. 3; and Fig. 5 is a bottom perspective view of the closure.

In the drawing, the vessel is designated 1, and is provided with the usual bail 2. On one side the vessel is provided with clips 3 which are connected to the side of the vessel and are bent outwardly, upwardly and then inwardly over the edge thereof for the reception of the edge of a cover 4, the cover being prevented from movement away from the clips 3, when the cover rests upon the vessel, by depressions 5 that are formed in the cover adjacent its edge remote from that which reposes within the clips 3, and are adapted for engagement with the adjacent edged portion of the vessel. In the region between the clips 3, as the cover is shown arranged, it is provided with a series of perforations 6, the perforations occurring in a flat annular portion of the cover adjacent its edge, such portion being designated $4^a$ and offset from the central portion of the cover by a substantially vertical portion $4^b$.

In the cooking of certain kinds of food, as the boiling of potatoes, beets, spinach, and the like, it is desirable to thoroughly drain the food of the water in which it is cooked prior to preparing it for the table, and to facilitate such operation, the side of the vessel opposite the clips 3 is equipped with a catch 7 that is pivoted to a bracket 8, secured to the vessel wall adjacent its upper edge. In draining the solid contents of the vessel of the liquid wherein it has been cooked, the user suspends the vessel by the bail 2 and grasps the handle 9 of the catch 7, swinging the nose 10 of the catch over, and upon the adjacent edged portion of the cover, thus holding the cover firmly against displacement while the vessel is swung upon the bail to allow the liquid to drain through the openings 6. Thus it will be seen that by means of the clips 3 and catch 7, the cover is held firmly in place, through the very natural operation of tilting the vessel by means of the handle 9.

While it is sometimes desirable to permit the steam to escape during the cooking process, there are other times when it is advantageous to retain the steam within the vessel to a reasonable extent, under which circumstances it is necessary to close the openings 6. A segmental slide 15 is provided for this purpose which normally lies flat upon the portion $4^a$ of the cover and has its inner edge turned downward to produce a flange 16, for engagement with the vertical portion $4^b$ of the cover. This slide is provided with openings 17, corresponding in number, size and location to the openings 6 of the cover 4, and when the slide is at the extreme limit of its movement in one direction the holes 17 coincide with those of the cover so that the steam may readily escape from the vessel, but when the slide is moved to the other extreme limit of its movement, the holes of the cover are closed by the slide. Thus it will be seen that the slide constitutes, in effect, a damper for the holes of the cover. The slide is movably secured to the cover by means which may now be described.

One end of the slide 15 (the right hand end as viewed in Fig. 2) is provided with a notch 18 which is adapted to embrace the neck 19 of a rivet 20, the rivet being reduced below the neck 19 for passage through holes in a depressed portion 21 of the cover, and washers 22, which are located on opposite sides of such depressed portion and serve to reinforce the same, the inner end of the rivet being upset as indicated at 23. At its opposite end, the slide is provided with a slot 25 within which the body portion 26 of a key 27 normally reposes, the key having a reduced shank 28 below the body portion 26 which passes through the washers 29 that reinforce the depressed portion 30 of the cover, the inner end of the key being upset at 31. It will be readily seen from the drawing that the head of the key 27 is narrower than the width of the slot 25 and somewhat shorter than the length thereof so that it may readily pass through the slot when turned longitudinally of it; and it will also be observed from Fig. 3, that there is sufficient space between the head of the rivet 20 and the adjacent portion of the cover 4 to allow the slide 15 to be tilted enough to lift its opposite end over the key 27, thus allowing the slide to be entirely removed from the cover in an extremely convenient manner for the purpose of thoroughly cleaning the normally concealed parts of the assembly. To facilitate the removal and manipulation of the slide 15, it is provided with a handle 35 that is preferably formed integral with the slide, the same consisting of an extension of the flange 16 that is turned upward alongside of and against the flange and then curved gradually away from the slide, to give it a shape adapted to the fingers. It is perfectly clear that when the slide is in place upon the cover and the head of the key turned transversely of the slot 25, the slide is securely held against removal from the cover, and it is only obvious that when the key head is turned longitudinally of the slot and the slide moved to central position, that the end of the slide adjacent the key may be elevated and removed from the key as illustrated in Fig. 3. After such removal of the adjacent end of the slide from the key, it is a simple matter to shift the entire slide away from the rivet 20 to free it therefrom.

Having thus described my invention, what I claim is:—

1. The combination with a cover having a flat portion that is provided with an opening, a plate slidable upon such portion and having a hole that is adapted to coincide with the opening of the cover, connecting means extending from the cover and having an enlargement spaced therefrom, the aforesaid plate having a notch that is adapted to embrace said means beneath its enlargement, and further connecting means swiveled within the cover and having an elongated enlargement spaced therefrom, the aforesaid plate having a slot through which the enlargement of the second mentioned means may be passed and turned transversely thereof to prevent the removal of the plate from the cover while permitting the same to slide withe respect thereto.

2. The combination with a cover having a flat portion, a plate that is adapted to normally rest upon said flat portion, one end of the plate being provided with a notch and the other with a slot, connecting means rising from the cover and adapted to be received by the aforesaid notch, said means having an enlargement spaced from the cover a distance somewhat greater than the thickness of the plate, and further connecting means swiveled within the cover and having an elongated enlargement that is adapted to be passed through the slot of the plate and turned transversely thereof, the slot and notch being of sufficient extent to permit a movement of the plate, the plate and cover being provided with openings that are adapted to register when the plate is in a given position with respect to the cover.

3. The combination with a cover having an annular flat portion adjacent its edge that is offset from the central portion of the cover by a substantially vertical portion, a segmental slide that is adapted to normally rest upon the annular portion of the cover and having a flange depending alongside the aforesaid vertical portion thereof, one end of the slide being provided with a notch and the other with a slot, connecting means rising from the cover and adapted to be received by the aforesaid notch, said means having an enlargement spaced from the cover a distance somewhat greater than the thickness of the slide, and further connecting means swiveled within the cover and having an elongated enlargement that is adapted to be passed through the slot of the slide and turned transversely thereof, the slot and notch being of sufficient extent to permit a movement of the slide, the slide and cover being provided with openings that are adapted to register when the slide is in a given position with respect to the cover.

In testimony whereof I hereunto affix my signature.

GEORGE L. HARRISON.